United States Patent [19]

Markunas et al.

[11] Patent Number: 4,743,163
[45] Date of Patent: May 10, 1988

[54] RAM AIR TURBINE CONTROL SYSTEM

[75] Inventors: Albert L. Markunas, Roscoe; Mordehy Cohen, Rockford, both of Ill.

[73] Assignee: Sundstrand Corporation, Rockford, Ill.

[21] Appl. No.: 800,796

[22] Filed: Nov. 22, 1985

[51] Int. Cl.$^4$ .............................................. F01D 7/02
[52] U.S. Cl. ........................................ 416/44; 416/51; 416/137
[58] Field of Search ................. 416/137, 43 A, 136, 416/139 R, 139 A, 44 R, 44 A, 51 R, 51 A, 52 R, 52 A, 53 R, 53 A, 48, 50 A

[56] References Cited

U.S. PATENT DOCUMENTS

| | | | |
|---|---|---|---|
| 2,275,053 | 3/1942 | Reissner et al. | |
| 2,416,541 | 2/1947 | Olman. | |
| 2,550,229 | 4/1951 | Cotton | 416/44 A |
| 2,583,369 | 1/1952 | Fumagalli | 416/137 X |
| 2,685,932 | 8/1954 | Hartel | 416/51 A |
| 2,857,006 | 10/1958 | Hook et al. | 416/52 A |
| 2,874,787 | 2/1959 | Battenberg et al. | 416/51 A X |
| 2,876,847 | 3/1959 | Blackburn et al. | 416/52 A |
| 2,955,656 | 10/1960 | Balje et al. | 416/137 |
| 2,970,652 | 2/1961 | Breaux et al. | 416/26 |
| 2,997,109 | 8/1961 | Blackburn | 416/175 A X |
| 3,013,613 | 12/1961 | Blackburn | 416/50 A |
| 3,469,633 | 9/1969 | Avondoglio | 416/51 |
| 3,580,694 | 5/1971 | Andersen | 416/136 |
| 4,257,736 | 3/1981 | Jacobs | 416/51 |
| 4,411,596 | 10/1983 | Chilman | 416/51 A |

FOREIGN PATENT DOCUMENTS

| | | | |
|---|---|---|---|
| 805388 | 5/1951 | Fed. Rep. of Germany | 416/44 A |
| 1036780 | 8/1958 | Fed. Rep. of Germany | 416/139 A |
| 2355179 | 1/1978 | France | 416/139 A |
| 2506853 | 12/1982 | France | 416/139 A |
| 57405 | 5/1946 | Netherlands | 416/136 R |
| 767907 | 2/1957 | United Kingdom | 416/51 A |

Primary Examiner—E. A. Powell, Jr.
Attorney, Agent, or Firm—Wood, Dalton, Phillips, Mason & Rowe

[57] ABSTRACT

A blade pitch control mechanism for a ram air driven turbine blade mounted for rotation on a hub assembly having a central axis. A governor control member, including a seat, is mounted on a portion of the hub assembly for reciprocation along the central axis. A first spring acts on the governor control member in a first axial direction. A governor slide member is mounted for reciprocation along the central axis. The blade is in mating engagement with the governor slide member. A second spring acts between the governor slide member and the seat of the governor control member for biasing the slide member opposite the first axial direction. This causes the blade to assume a course pitch when the blade and hub assembly are in storage and to allow the blade to move to fine pitch during start-up. A flyweight is mounted on the hub assembly and engages the governor control member for acting against the first spring to control blade pitch and govern turbine speed after start-up.

15 Claims, 2 Drawing Sheets

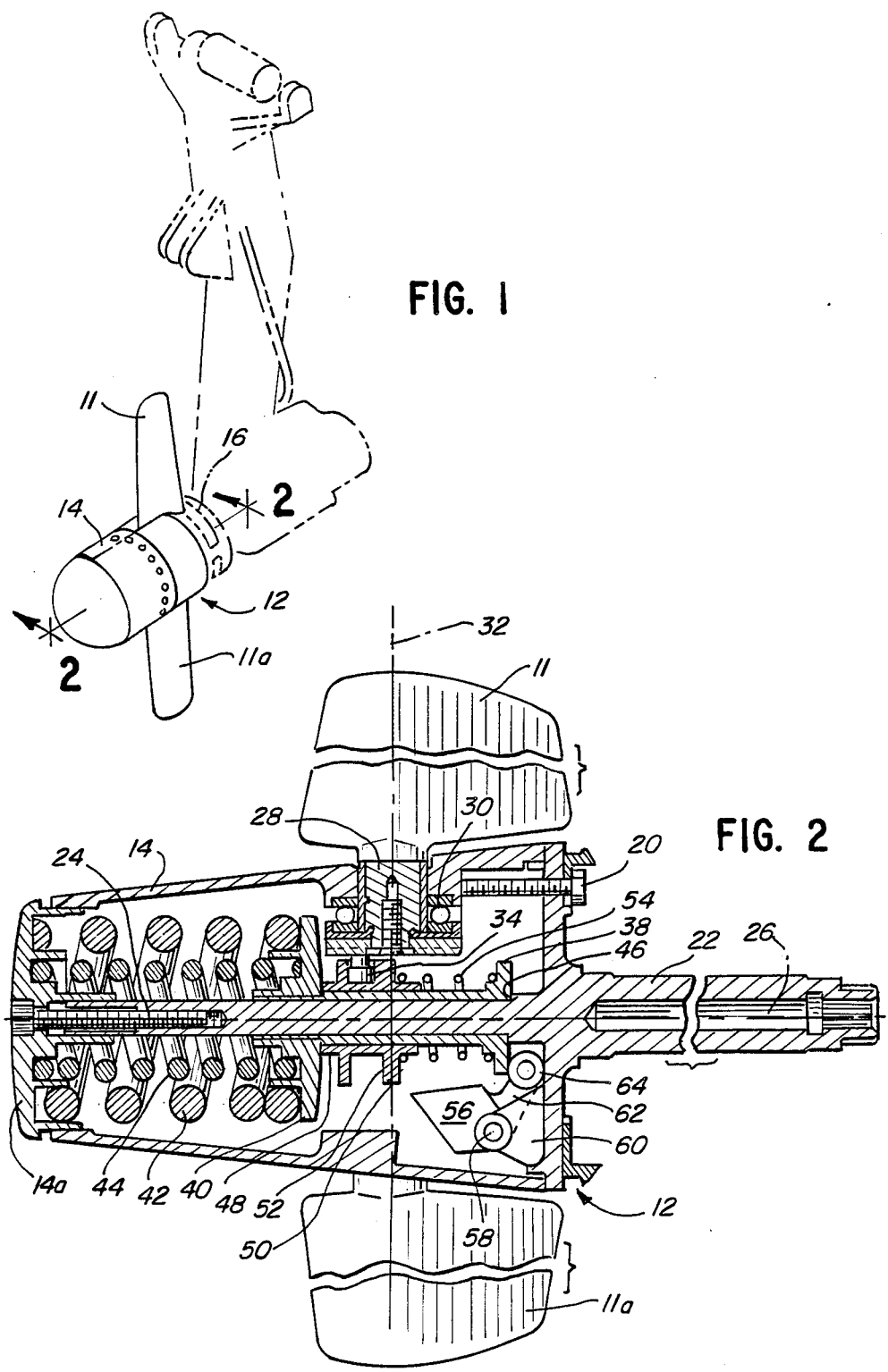

RAM AIR TURBINE CONTROL SYSTEM

FIELD OF THE INVENTION

This invention relates to an improvement in ram air turbine blade control.

BACKGROUND OF THE INVENTION AND DESCRIPTION OF THE PRIOR ART

It is conventional for aircraft to include as standard equipment backup power supplied for use in times of power outage in the form of air driven turbines which are lowered into the airstream. The turbines make use of the relative speed of the aircraft through the ambient air to cause the turbine blades to rotate. The rotation imparted to the blades due to their movement through the air is then used to drive electrical generating gear or provide hydraulic power to the aircraft hydraulic system during the aforementioned times of power outages. These arrangements conventionally include governor mechanisms that control the output rotational speed delivered from the blades to electrical or hydraulic units that are designed to operate most efficiently at a set or given speed.

An example of such a control system is shown in U.S. Pat. No. 4,411,596 to Chilman, dated Oct. 25, 1983 and assigned to the assignee of this invention. Chilman discloses a blade pitch control mechanism for a turbine blade mounted for rotation in a hub assembly. The control mechanism includes a drive member mounted for reciprocation along a central axis of the hub assembly. The drive member has a control member secured to one end and a seat member at the other end. The blade has operatively coupled thereto, a centrifugally responsive means which includes a pin in mating engagement with the control member. A spring is positioned between the hub assembly and the control member to thereby cause the blade to assume a course or high pitch position when the blade and hub assembly are in storage. A slide member is mounted on a portion of the hub assembly for reciprocation along the central axis. A spring is positioned between the seat member and the slide member. A flyweight is supported on the hub assembly and engages the slide member. Rotation of the hub assembly causes the flyweight to move the slide member and thereby move the blade pitch from course pitch to fine pitch and, thereafter, allow the centrifugally responsive means to control the blade pitch.

Although the Chilman control system is quite effective, there is a need for a simplified ram air turbine control which is of lighter weight, lower in cost and comprising a smaller envelop. This invention is directed to solving this need and provides a ram air turbine control system of the character described which completely eliminates the centrifugally responsive means coupled to the turbine blade.

SUMMARY OF THE INVENTION

An object, therefore, of the invention is to provide an improved, simplified blade pitch control mechanism for ram air turbines or the like.

In the exemplary embodiment of the invention, a blade pitch control mechanism is provided for a ram air driven turbine blade mounted for rotation on a hub assembly having a central axis. A governor control member, including a seat, is mounted on a portion of the hub assembly for reciprocation along the central axis. First biasing means acts on the governor control member in a first axial direction. A governor slide member is mounted for reciprocation along the central axis. The blade has means secured thereto in mating engagement with the governor slide member. Second biasing means acts between the governor slide member and the seat of the governor control member for biasing the governor slide member opposite the first axial direction, to thereby cause the blade to assume a course pitch when the blade and hub assembly are in storage and to allow the blade to move to fine pitch during start-up. Flyweight means are supported on the hub assembly and engage the governor control member for acting against the first biasing means to control blade pitch and govern turbine speed after startup.

In the illustrated embodiment, the hub assembly includes an output shaft on the central axis, and the governor control member and governor slide member are reciprocally mounted on the output shaft. The control member and the slide member are generally cylindrical, with the slide member telescopically positioned about the control member. The first and second biasing means comprise coil springs. The governor slide member includes a yoke portion, and the blade has a pin in mating engagement with the yoke to form a motion translating mechanism. The flyweight means is pivotally mounted on the hub assembly.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a ram air turbine blade assembly embodying the invention;

FIG. 2 is a section taken generally along line 2—2 of FIG. 1, with the blade pitch control mechanism of the invention in storage condition;

DETAILED DESCRIPTION OF THE PREFERRED EMBODIMENT

Figure 3:
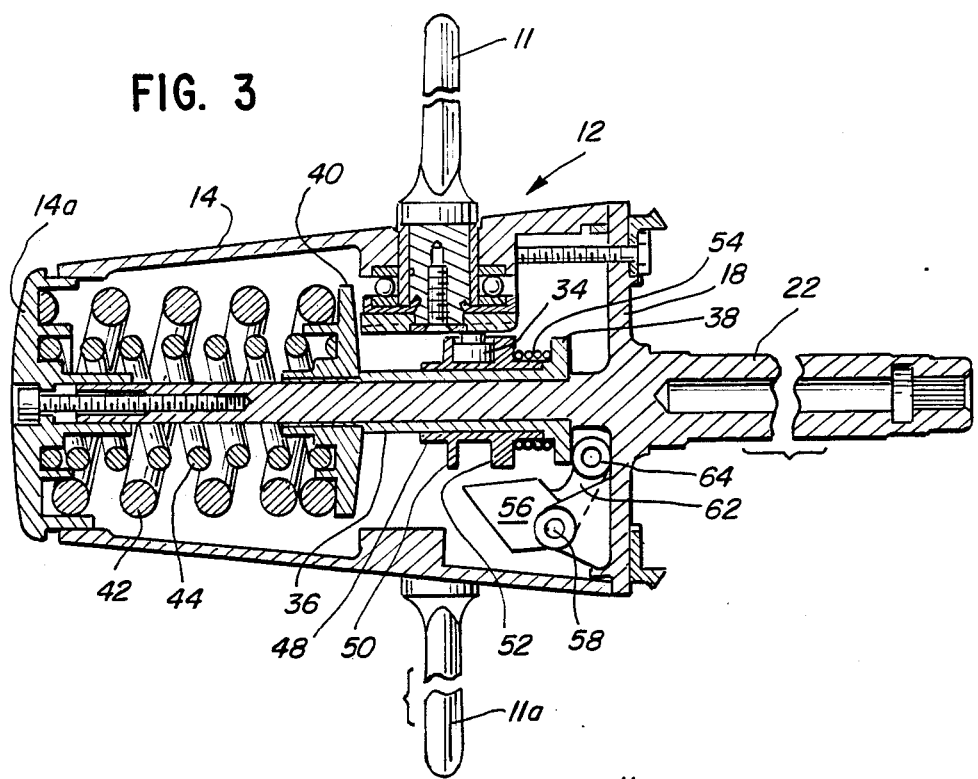
FIG. 3 is a section similar to that of FIG. 2, with the blade pitch control mechanism moved to fine pitch during start-up.

Referring to the drawings in greater detail, and first to FIG. 1, a depiction is shown in which the ram air driven turbine blade and control mechanism (in solid lines) is secured to a depending strut arrangement shown in dotted outline. When the ram air turbine is not in use, it is drawn back into the fuselage of the aircraft, not shown. Blades 11 and 11a are shown in course pitch position. The blades are placed in the course or high pitch position for storage purposes. The control mechanism of the invention moves the blades from the course position to a fine pitch, and thereafter provides blade pitch control to govern a constant speed output. The blades are rotatably mounted in a hub assembly, generally designated 12, including a cover, generally designated 14. The hub assembly is rotatably mounted on a support 16 of the strut arrangement.

FIG. 2 illustrates the preferred embodiment of the invention and shows, in section, a ram air turbine blade assembly of the type shown in solid lines in FIG. 1. Blades 11,11a are rotatably mounted on hub assembly 12. The hub assembly includes cover 14 which has an end cap 14a at one end and a cover plate 18 secured by bolts 20 at the other end. A drive shaft 22 is formed integrally with end plate 18. A bolt 24 secures end cap 14a to the assembly by threading engagement into the distal end of drive shaft 22. The drive shaft comprises the output shaft means of the control mechanism. Hub assembly 12, including drive shaft 22, rotates about a central longitudinal axis 26. As will be seen hereinafter, end cap 14a and bolt 24 can be rotated to adjust the speed control set point.

Blades 11,11a each have a root portion 28 for rotation therewith. Each blade with its root portion is mounted for rotary motion in hub assembly 12 and is supported in place by thrust bearings 30. The blades are rotatable about a common axis 32. Each blade has a cam follower end portion in the form of a radially inwardly projecting pin 34.

The blade pitch control mechanism includes a governor control member 36, including a seat 38, mounted for reciprocation along central axis 26. More particularly, the governor control member is generally cylindrical and is positioned about drive shaft 22 for axial reciprocation relative thereto. The governor control member includes an enlarged, annular flange portion 40 projecting radially outwardly to form a seat for a pair of compression coil springs 42 and 44. The coil springs act between cover end cap 14a and annular flange 40 as a biasing means to bias governor control member 36 to the right, as viewed in FIG. 2, against a stop 46 on drive shaft 22. This is the storage position or condition of the control mechanism.

A governor slide member 48 is mounted for reciprocation along central axis 26. Specifically, the slide member is generally cylindrical in shape and is positioned about governor control member 36 for axial reciprocation therealong. The slide member includes a yoke portion 50 forming an annular cam slot 52 for receiving cam follower pins 34 of blades 11,11a. Second biasing means in the form of a coil spring 54 acts between governor slide member 48 and seat 38 of governor control member 36, to thereby cause the blades to assume a course pitch when the blades and hub assembly are in storage condition as illustrated in FIG. 2.

During start-up, the centrifugal twisting moments of blades 11,11a force governor slide member 36 against the biasing of coil spring 54 to a position as illustrated in FIG. 3. This moves the blades to fine pitch condition as governor slide member 48 moves against seat 38.

Figure 4:
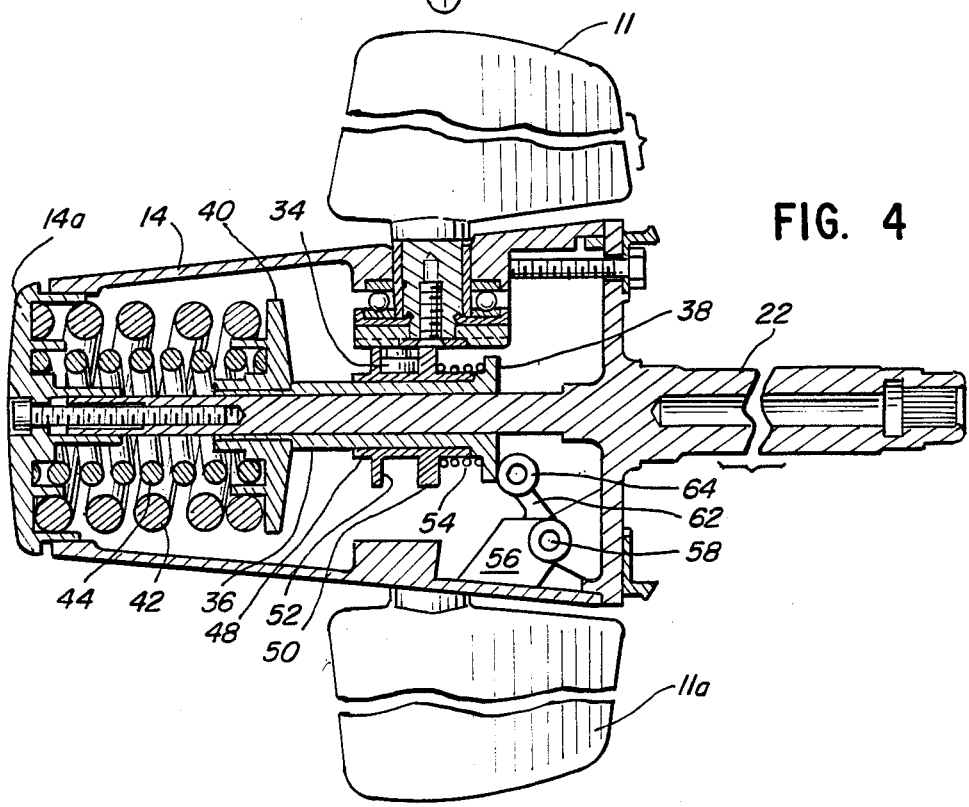
FIG. 4 is a section similar to that of FIGS. 1 and 2, with the blade pitch control mechanism in condition for controlling blade pitch after start-up.

As the turbine comes up to speed, flyweight means are provided to control the blade pitch and govern the turbine speed after the start-up condition described above. More particularly, as shown in the drawings, a flyweight 56 is pivotally mounted by a pin 58 on an interior support portion 60 formed integrally on the inside of end plate 18 of hub assembly 12. The flyweight has an arm portion 62 with a contact roller 64 mounted on the distal end thereof. The contact roller engages the inner side of seat 38 of governor control member 36. It will be understood that rotary motion of the hub assembly, including drive shaft 22, will cause flyweight 56 to move radially outwardly, resulting in contact roller 64 asserting a force on seat 38 of governor control member 36. This, in turn, tends to compress springs 42,44 to cause the governor control member to move to the left, as viewed in FIG. 4. As stated above, end cap 14a and bolt 25 can be rotatably adjusted. This adjusts the preload on compression springs 42,44 and thereby adjusts the predetermined or designed governed speed.

Although only one flyweight 56, contact roller 64, etc. are shown in the drawings, it would be preferred to have two or more flyweights equally spaced angularly about the axis 26 of the turbine for proper balance.

In operation, blades 11,11a, while in storage, are in the course pitch position as shown in FIG. 2. The initial action of the air passing the blades is to induce a high starting torque, which torque is transmitted through blade root portions 28 and cam follower pins 34 to governor slide member 48. Yoke portion 50 of the governor slide member, defining annular cam slot 52, cooperates with cam follower pins 34 to define a motion translating mechanism to cause governor slide member 48 to move against coil spring 54 which, in turn, rotates the blades initially toward a fine pitch position as shown in FIG. 3. In essence, the air produces a high starting torque that causes the entire turbine to accelerate about the main turbine axis 26. The torque that causes the blades to rotate to fine pitch upon startup is due to centrifugal forces and is called the centrifugal twisting moment. As the entire unit comes up to operating speed, flyweight 56 acts to control the blade pitch and govern the turbine speed by compressing springs 42,44 as described above in relation to FIG. 4.

As the speed increases, the flyweights control the designed governed speed, moving the blades to a position at which rotational equilibrium is established. When the air flow passing the blades is removed, the turbine will stop rotating, compression springs 42 and 44 will return governor control member 36 to its storage position, and compression spring 54 will move governor slide member 48 to its storage position, with the blade in a course pitch starting condition as illustrated in FIG. 2. From the foregoing description, it is apparent that the invention described provides an improved blade pitch control mechanism which is very simple, light in weight, cost effective and assembled in a small envelop. The reduced number of mechanically connected components, particularly eliminating centrifugally responsive means on the blades themselves, provides a highly efficient, simple mechanism for controlling the adjustment of blade pitch.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A blade pitch control mechanism for a ram air driven turbine blade mounted for rotation on a hub assembly having a central axis, comprising:

a governor control member, including a seat, mounted on a portion of the hub assembly for reciprocation along said central axis;

first biasing means acting on said governor control member in a first axial direction;

a governor slide member mounted for reciprocation along the central axis;

said blade having means secured thereto in mating engagement with said governor slide member;

second biasing means acting between the governor slide member and the seat of the governor control member for biasing the governor slide member opposite said first axial direction to thereby cause the blade to assume a coarse pitch when the blade and hub assembly are in storage and to allow the blade to move to fine pitch during start-up; and flyweight means supported on the hub assembly and directly engaging the governor control member independently of the governor slide member for acting against the first biasing means to control blade pitch and govern turbine speed after start-up.

2. The blade pitch control mechanism of claim 1 wherein said central axis is longitudinal, said hub assembly includes an output shaft on the axis, and said governor control member and said governor slide member are reciprocally mounted on the output shaft.

3. The blade pitch control mechanism of claim 2 wherein said governor control member at least in part is generally cylindrical and positioned about the output shaft.

4. The blade pitch control mechanism of claim 3 wherein said first biasing means comprises a coil spring positioned about the output shaft and acting between the governor control member and an end of the hub assembly.

5. The blade pitch control mechanism of claim 3 wherein said governor slide member is generally cylindrical and positioned about the governor control member.

6. The blade pitch control mechanism of claim 5 wherein said second biasing means comprises a coil spring positioned about the governor control member between said seat and the governor slide member.

7. The blade pitch control mechanism of claim 1 wherein said governor slide member includes a yoke portion, and the blade has a pin in mating engagement with the yoke to form a motion translating mechanism.

8. The blade pitch control mechanism of claim 1 wherein said flyweight means is pivotally mounted on the hub assembly.

9. The blade pitch control mechanism of claim 1 wherein said hub assembly includes a cover for the governor control member, governor slide member and biasing means, and a cover end plate having an output shaft integral therewith.

10. The blade pitch control mechanism of claim 9 wherein the output shaft extends axially into the cover, and the governor control member and governor slide member are reciprocally mounted on the output shaft within the cover.

11. The blade pitch control mechanism of claim 1 wherein said governor slide member is reciprocally mounted on the outside of the governor control member.

12. A control system for a ram air driven turbine blade mounted for rotation on a hub assembly which includes an output shaft on a longitudinal central axis, comprising:

a generally cylindrical governor slide member reciprocally mounted about the output shaft for reciprocation along the longitudinal central axis;

motion translating means in engagement between the governor slide member and the turbine blade to cause the blade to assume a coarse pitch when the blade and hub assembly are in storgage and to allow the blade to move to fine pitch during start-up;

a generally cylindrical blade pitch governor control member reciprocally mounted about the output shaft within the generally cylindrical governor slide member for reciprocation along the longitudinal central axis;

spring means acting on the governor control member in an axial direction; and flyweight means pivotally supported on the hub assembly and directly engaging the governor control member independently of the governor slide member for acting against the spring means to control blade pitch and govern turbine speed after start-up.

13. The blade pitch control mechanism of claim 12 wherein said governor slide member includes a yoke portion, and the blade has a pin in mating engagement with the yoke to form a motion translating mechanism.

14. The blade pitch control mechanism of claim 12 wherein said hub assembly includes a cover for the governor control member and governor slide member, and a cover end plate having an output shaft integral therewith.

15. The blade pitch control mechanism of claim 14 wherein the output shaft extends axially into the cover, and the governor control member and governor slide member are reciprocally mounted on the output shaft within the cover.

* * * * *